United States Patent [19]

Slack et al.

[11] Patent Number: 5,428,124
[45] Date of Patent: Jun. 27, 1995

[54] UREA AND BIURET LIQUID PREPOLYMERS OF MDI

[75] Inventors: William E. Slack; Robert P. Yeater, both of Moundsville, W. Va.; Robson Mafoti, Pittsburgh, Pa.; Josef Sanders, Leverkusen, Germany

[73] Assignee: Miles Inc., Pittsburgh, Pa.

[21] Appl. No.: 247,728

[22] Filed: May 23, 1994

[51] Int. Cl.$^6$ .................. C08G 18/10; C08G 18/30
[52] U.S. Cl. .......................... 528/60; 528/61; 528/65; 528/75; 528/76; 528/84; 528/85; 521/159; 521/160; 521/163
[58] Field of Search .............. 528/60, 61, 65, 75, 528/76, 84, 85; 521/159, 160, 163

[56] References Cited

U.S. PATENT DOCUMENTS

| | | | |
|---|---|---|---|
| 3,666,726 | 5/1972 | Grogler et al. | 260/77.5 CH |
| 3,862,973 | 1/1975 | Dietrich et al. | 260/453 AB |
| 4,618,706 | 10/1986 | Scholl et al. | 560/335 |
| 5,098,984 | 3/1992 | Mafoti | 528/73 |
| 5,151,470 | 9/1992 | Sanders et al. | 528/111 |
| 5,198,522 | 3/1993 | Steppan et al. | 528/61 |

*Primary Examiner*—Paul R. Michl
*Assistant Examiner*—D. Truong
*Attorney, Agent, or Firm*—Joseph C. Gil; Godfried R. Akorli; Lyndanne M. Whalen

[57] ABSTRACT

Storage stable, liquid prepolymers of diphenylmethane diisocyanate containing urea and/or biuret groups are prepared by reacting an aminocrotonate with a mixture of isocyanates having a specified diphenylmethane diisocyanate isomer content. These prepolymers have isocyanate group contents of from about 5 to about 30%.

6 Claims, No Drawings

UREA AND BIURET LIQUID PREPOLYMERS OF MDI

BACKGROUND OF THE INVENTION

1. Field of the Invention

The present invention relates to liquid diphenylmethane diisocyanate (MDI) prepolymers having urea or biuret groups. More specifically, the invention relates to prepolymers which are prepared by reacting MDI and aminocrotonates.

2. Brief Description of the Prior Art

Urea and biuret prepolymers are generally known in the art. U.S. Pat. No. 3,862,973 discloses biuret-containing polyisocyanates which are prepared by reacting organic polyisocyanates with secondary amines at temperatures of from about 80° to 200° C. The amines employed in this disclosed process are selected from the group consisting of N-methyl aniline, N-ethylaniline, octadecylaniline, diphenylamine, dibenzylamine, pyrrolidone, morpholine, N,N'-diethyl-4,4'-diaminodiphenylmethane, N,N'-diethyl-2,6-tolylene diamine, N,N'-diamino diphenylether and the like.

U.S. Pat. No. 4,618,706 discloses a process for the preparation of aromatic polyisocyanates containing urea and/or biuret groups, optionally in the form of a mixture of homologues and/or isomers by the reaction of aromatic diisocyanate with diamines having primary or secondary amino groups at about 20° to 180° C.

U.S. Pat. No. 3,666,726 discloses polymers containing polyamide, urea and/or urethane groups which are produced by the polyaddition of aliphatic or aromatic polyisocyanates with polyfunctional aminocrotonic acid esters in the presence of a crosslinking agent. In the disclosed process, polyfunctional aminocrotonic acid esters are reacted with polyisocyanates in a ratio of NCO to active hydrogen groups of greater than 1 and preferably 2. This reaction may be carried out in the presence or absence of solvents. Crosslinking agents useful in the disclosed process include water and polyols which may contain hetero atoms such tertiary nitrogen atoms, aminoalcohols, polyamides or diacarboxylic acid hydrazides.

U.S. Pat. No. 5,098,984 discloses an isocyanate-terminated prepolymer having an isocyanate group content of from about 10 to 26% by weight prepared by (1) reacting a $C_1$ to $C_5$ alkyl acetoacetate with a polyol having a molecular weight of from about 500 to about 6000 and a hydroxyl functionality of from 2 to 4 and (2) reacting the resultant product with an organic diisocyanate and/or polyisocyanate.

Quite often, the preparation of prepolymers entails the reaction of polyisocyanates with mono- or polyamines at elevated temperatures. The use of high temperatures is uneconomical and can result in product discoloration, and in some cases the liberation of volatile and toxic by-products via a series of biuret exchange reactions. The resultant prepolymers, particularly those derived from diphenylmethane diisocyanates, are not stable liquids.

By the present invention there is provided a facile process for preparing liquid isocyanates containing urea and/or biuret groups.

SUMMARY OF THE INVENTION

It is an object of the present invention to provide a process for the production of liquid isocyanate prepolymers which are storage stable.

It is also an object of the present invention to provide storage stable, liquid isocyanate prepolymers having an isocyanate group content of from 5 to 30% by weight.

It is a further object of the present invention to provide storage stable, liquid isocyanate prepolymers containing urea and/or biuret groups which are useful in reaction injection molding processes.

These and other objects which will be apparent to those skilled in the art are accomplished by reacting a polyfunctional amino-crotonic acid ester represented by a specified formula with a mixture of polyisocyanates in which from about 20 to about 100% by weight of the mixture is diphenylmethane diisocyanate.

DETAILED DESCRIPTION OF THE PRESENT INVENTION

The present invention relates to storage stable, liquid isocyanate prepolymers having an isocyanate group content of from about 5 to about 30% and to a process for the production of such prepolymers. These prepolymers are made by reacting a) a polyfunctional amino-crotonic acid ester of the general formula:

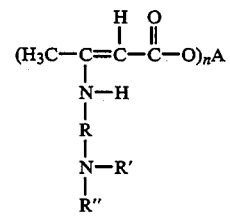

wherein
- R represents a hydrocarbyl moiety selected from alkyl, alkenyl, cycloalkyl, aralkyl and aryl radicals,
- R' represents hydrogen or a hydrocarbyl moiety selected from alkyl, alkenyl, cycloalkyl, aralkyl and aryl radicals which moiety may optionally contain a primary or secondary amine group,
- R" represents hydrogen or a hydrocarbyl moiety selected from alkyl, alkenyl, cycloalkyl, aralkyl and aryl radicals which moiety may optionally contain a primary or secondary amine group,
- R' and R" together may optionally make up a cyclic moiety containing at least one primary or secondary amine group in or on the cyclic moiety,
- A represents the radical of a polyol from which the terminal OH groups have been removed which polyol has a molecular weight of from about 250 to about 6000 and a functionality of n and
- n represents an integer of from 2 to 6 with b) a mixture of isocyanates made up of from 20 to 100% by weight of diphenylmethane diisocyanate. From about 3 to about 50% by weight of the mixture of isocyanates is made up of the 2,2'- and 2,4'-isomers of diphenylmethane diisocyanate. From about 0 to about 80% by weight of mixture of isocyanates is made up of polyphenylpolymethylene polyisocyanate. When the mixture of isocyanates is made up of from about 95 to about 100% by weight of diphenylmethane diisocyanate, at least 10% by weight of the diisocyanate must be the 2,2' and 2,4'-isomers.

The present invention further encompasses a method of using the isocyanate prepolymer. It is a distinct feature of the invention that the liquid MDI prepolymer (urea/biuret) is stable and liquid at 25° C. The term "stable" as it is used in this application means that the isocyanate has no more than one percent absolute change in NCO content and no more than ten percent change in viscosity when stored at 25° C. for 3 months.

The term "liquid" as it is used in this application means that the modified isocyanate does not precipitate solids when stored at 25° C. for 3 months.

The term "hydrocarbyl moiety" as used herein denotes unsubstituted and substituted hydrocarbons, provided that the substituents of the substituted hydrocarbon do not adversely affect the reaction or use of the product.

The liquid MDI prepolymers of the invention have been found to be particularly useful in the production of polyurethane foams, elastomers, and reaction injection molding (RIM) products.

The polyfunctional aminocrotonates useful in the practice of the present invention may be produced by reacting a polyfunctional acetoacetic acid ester and a polyamine. Techniques for producing these polyfunctional acetoacetic acid esters are known in the art. Examples of such processes are disclosed in U.S. Pat. Nos. 3,666,726 and 3,691,112, the disclosures of which are herein incorporated by reference.

In general, the acetoacetic acid esters may be produced by reacting polyols with diketenes, or by transesterifying alkyl acetoacetates with polyols. Transesterification is the presently preferred technique. In general, the transesterification reaction is conducted at temperatures ranging from about 100° to about 210° C. for periods of time ranging from 2 to 8 hours. If desired, transesterification catalysts, such as dibutyltin oxide and tetrabutyl titanate, may be used.

Any of the known polyols may be useful in producing the polyfunctional acetoacetic acid esters. Suitable polyols typically have a molecular weight of from about 62 to 12,000, preferably from about 800 to about 3500 and have hydroxyl functionalities of from about 2 to about 6, preferably from about 2 to about 4. Examples of suitable polyols include any of the polyesters, polyethers, polythioethers, polyacetals, polybutadienes and polycarbonates containing from about 2 to about 6 hydroxyl groups of the type known for the production of polyurethanes. The polyethers suitable for use in accordance with the invention are known and may be obtained, for example, by polymerizing an epoxide (e.g., ethylene oxide, propylene oxide, butylene oxide, tetrahydrofuran, styrene oxide or epichlorohydrin) in the presence of $BF_3$ or by chemically adding the epoxide (preferably ethylene oxide and propylene oxide), in admixture or successively to one or more components containing reactive hydrogen atoms (e.g., water, alcohols or amines). Examples of suitable alcohols and amines include: low molecular weight diols, triols and tetrols, 4,4'-dihydroxy diphenyl propane, sorbitol, aniline, ammonia, ethanolamine and ethylene diamine.

Suitable polyester polyols include the reaction products of polyhydric, preferably dihydric, alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described, for example, in U.S. Pat. Nos. 4,098,731 and 3,726,952, herein incorporated by reference in their entirety. Suitable, polythioethers, polyacetals, polycarbonates and other polyhydroxyl compounds are also disclosed in the above-identified U.S. patents. Additional examples of the many and varied polyols which may be used in accordance with the invention are disclosed, for example, in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

Polyols useful in the practice of the present invention also include materials which are typically used as chain extenders in polyurethane chemistry. Examples of such materials include: ethylene glycol; 1,2- and 1,3-propanediol; 1,3- and 1,4- and 2,3-butanediol; 1,6-hexanediol; 1,10-decanediol; diethylene glycol; triethylene glycol; tetraethylene glycol; dipropylene glycol; tripropylene glycol; glycerol; trimethylol propane; and pentaerythritol.

The polyfunctional acetoacetic acid esters are preferably prepared by transesterifying any of the above-described polyols with lower alkyl acetoacetates. By "lower alkyl" is meant alkyl groups containing from one to five carbon atoms. Specific useful aceto-acetates include: methyl acetoacetate, ethyl acetoacetate, t-butyl acetoacetate, propyl acetoacetate and the like, with t-butyl acetoacetate being the presently preferred material.

In preparing the acetoacetic acid esters, transesterification catalysts may be necessary. It is generally preferred that the reactants from which the polyfunctional acetoacetic acid ester is prepared be used in amounts such that one OH group is present for each acetoacetate group. However, it is also possible to use excess amounts of either reactant. In fact, in some cases it is preferred to use an excess of the acetoacetate to ensure complete reaction. Use of less than an equivalent amount of acetoacetate so that unreacted hydroxyl groups remain is desirable when a lowered viscosity is desired.

Ammonia or an organic compound which contains one or more primary amino groups can be reacted with the polyfunctional acetoacetic acid ester in order to form the aminocrotonate. The organic compound containing one or more primary amino groups can be aliphatic or aromatic. Specific examples of suitable amines include: ethylene diamine; hexamethylene diamine; 2-methyl-1,5-diaminopentane; isophorone diamine; methylene biscyclohexylamine; methylene bis-methylcyclohexylamine; diethylene triamine; triethylene tetramine; diethyltoluene diamine and the various isomers and isomer mixtures thereof; toluene diamine and the various isomers or isomer mixtures thereof; methylenebis(phenyl amine) and the various isomers or isomer mixtures thereof; 1,5-naphthalene diamine; isophorone diamine; aniline; alkyl aniline; toluidine; t-butyl toluene diamine and the various isomer and isomer mixtures thereof; di-t-butyl toluene diamine and various isomers and isomer mixtures thereof methylene bis (o-dichloroaniline (MOCA)); 2,4-diaminoalkylbenzenes and homologues, isomers and isomer mixtures thereof having alkyl radicals of from 8 to 15 carbon atoms (as described in published European Patent Application 58,368); 1-(2-aminoethyl)piperazine; 4-(aminomethyl)-piperidine; N-cyclohexyl-1,3-propanediamine; S-permidine; and 4-aminobenzylamine.

The preparation of aminocrotonates through the reaction of a polyfunctional acetoacetic acid ester and a polyamine can be conducted in the presence or absence of a solvent. The solvent, if used, can be the same type described in U.S. Pat. Nos. 3,666,726, and 3,691,112. Preferred solvents are those that form azeotropes with water. Suitable solvents include: methylene chloride, chloroform, chlorobenzene, dichlorobenzenes, toluene, xylenes, ethylacetate, propylacetate, butylacetate, diethylether, dibutylether, and the like. Toluene is the preferred solvent. The amount of solvent is generally selected so as to be sufficient for dissolving the starting materials. In general, the solvent is used in a quantity of from 20 to 500, and preferably from 50 to 200 parts by weight per 100 parts by weight of the polyfunctional acetoacetic acid ester.

A catalyst, if used, is selected from boron trifluoride etherate and organic acids having $pK_a$ values of from 0.1 to 0.8. It has been found that use of catalysts having $pK_a$ values outside the 0.1–0.8 range results in side reactions which lead to solid products. In addition, only the catalysts noted are known to produce commercially acceptable yields. The amount of catalyst is generally selected so as to be sufficient to allow reasonable reaction times. In practice, the catalyst is added in amounts of from about 0.05 to about 2.0 mole %, and preferably from about 0.3 to about 1.0 mole %, based on the number of equivalents of acetoacetate present. This corresponds to from about 0.01 to about 0.2% by weight, and preferably from about 0.05 to about 0.1% by weight based on the weight of the polyfunctional acetoacetic acid ester.

The amount of amine is generally selected so that one mole of amine is available for every acetoacetate equivalent. It is, of course, possible to react less than one mole of diamine with one equivalent of acetoacetate. Use of this less than equivalent amount of amine might result in a lower conversion if the reaction is terminated before all acetoacetate groups have reacted with amine groups, or in chain extension if all acetoacetate groups have reacted. To suppress chain extension and to obtain low viscosity products, it might be advantageous to use more than one mole of diamine per equivalent of acetoacetate. The unreacted diamine can either be stripped off once the reaction is complete or remain in the product to serve as a chain extender (e.g, in a reaction with isocyanates).

The reaction of a polyfunctional acetoacetic acid ester with a polyamine is generally carried out at a temperature of from about 40° to about 200° C., preferably from about 60° to about 120° C., under excess pressure, reduced pressure, or, preferably, in the substantial absence of pressure. This process can be conducted continuously or discontinuously. In general, the acetoacetic acid ester, the amine, and the catalyst are dissolved in the solvent, if it is employed. The reaction mixture is refluxed while the water of reaction is collected. When no more water comes off, the reaction is considered complete. The reaction time, of course, depends on the nature and the amounts of starting materials. In general, reaction times are between 1 and 6 hours. When the reaction is complete, the catalyst and any unreacted amine (if desired) are distilled off. The distillate can generally be recycled. The resultant polyfunctional aminocrotonate is alternately referred to herein as an "amine terminated polyether" or "ATP".

The mixture of isocyanates which is reacted with the aminocrotonate to form the prepolymer of the present invention is made up of from about 20 to about 100% and preferably from about 70 to about 100% by weight of diphenylmethane diisocyanate. From about 3 to about 50% by weight of the diphenylmethane diisocyanate is made up of the 2,2'- and 2,4'-isomers. From 0 to about 80% by weight of the mixture of polyisocyanates is made up of polyphenylpolymethylene polyisocyanate. When the mixture of isocyanates is made up of from 95–100% by weight of diphenylmethane diisocyanate, at least 10% by weight of the mixture of isocyanates must be the 2,2' and 2,4'-isomers.

The prepolymers of the present invention containing urea groups may be prepared by any of the known techniques. In one such method, the mixture of isocyanates is heated to the desired temperature (usually between 25° and 60° C.) and then adding the aminocrotonate to the stirred mixture of isocyanates.

The prepolymers of the present invention containing biuret groups may also be prepared by any of the known techniques. One method for preparing these prepolymers is to heat the mixture of isocyanates to the desired temperature (usually between 25° and 60° C.), adding the aminocrotonate to the stirred mixture of isocyanates, and then heating the resultant mixture at a temperature of from about 100° to about 150° C. for 20 to 40 minutes to get the biuret or by adding the aminocrotonate to the mixture of isocyanates at a temperature between 100° and 150° C. and maintaining the resultant mixture at that temperature for from about 20 to about 40 minutes.

Solvents which are typically inert to isocyanate reaction and catalysts may be employed in the process for producing the prepolymers of the present invention.

The isocyanate prepolymers of the present invention have an NCO content of from about 5 to about 30% and preferably from about 9 to about 25% by weight. These prepolymers generally have viscosities in the range of from about 200 to about 10,000 cps at 25° C., preferably from about 500 to about 5000 cps at 25° C.

In the practice of the present invention, the prepolymers have been found to have good reactivity. For example, in their use in reaction injection molding (RIM) processes, compositions including the prepolymers of the present invention have been found to exhibit good "mold fill". These prepolymers can be reacted with polyols or other organic compounds containing active hydrogen groups (e.g., compounds having hydroxyl groups, primary or secondary amino groups or a combination thereof) which are usually of a high molecular weight (i.e., have a molecular weight of from about 400 to about 12,000). Organic compounds containing active hydrogen groups (e.g., hydroxyl groups, primary or secondary amino groups or a combination thereof) having a molecular weight of up to 400 (commonly known as chain extenders) may also be included in reaction mixtures containing the prepolymers of the present invention. Products prepared with the prepolymers of the present invention have been found to have good performance properties. For example, elastomers prepared with these prepolymers have particularly good heat sag properties.

The invention is further illustrated but is not intended to be limited by the following examples in which all parts and percentages are by weight unless otherwise specified.

EXAMPLES

The aminocrotonates used in these Examples were prepared as follows:

ATP-A 700 pounds (318.2 kg) of a poly(oxypropylene) diol having a molecular weight of 2,000 and 125 pounds (56.8 kg) of tert-butyl acetoacetate were charged to a 100 gallon (378.5 liter) reactor equipped with mechanical agitation and a distillation column. The mixture, under a nitrogen pad, was heated to 160° C. with agitation over a period of 3.5 hours at which point distillation of tert-butanol began. The temperature was further raised in a two hour period to 200° C. and held for three hours. The temperature was lowered to 160° C. and the pressure reduced slowly to 5 mm Hg. The mixture was held at the reduced pressure for two hours to insure that removal of the tert-butanol was complete. This process yielded a pale yellow liquid with viscosity of 340 mPa.s at 25° C. and a carbonyl number of 50.

731.5 pounds (332.5 kg) of the acetoacetylated polyol prepared above, 74.4 pounds (33.8 kg) of 1,5-diamino-2-methyl-pentane, and 6.0 pounds (2.7 kg) of diethyl-toluenediamine (commercially available under the name Baytek E 505 from Miles Inc.) were charged to a 100 gallon reactor equipped with mechanical agitation and a distillation column. To this well stirred mixture were added 0.28 pounds (0.13 kg) of triflouroacetic acid. The mixture was heated to 80° C. under a nitrogen pad. The pressure was then reduced to 5 mm Hg while concurrently raising the temperature to 110° C. The mixture was held at 110° C. and less than 5 mm Hg for 30 minutes to insure complete removal of the water. The excess 1,5-diamino-2-methylpentane and diethyltoluenediamine were removed by wiped thin film evaporation to provide a clear yellow liquid having a viscosity of 24,450 mPa.s (25° C.) and an amine number of 50.9.

ATP-B 80 pounds (36.4 kg) of poly(oxypropylene-oxyethylene) triol having a molecular weight or 6000 and 7.3 pounds (3.3 kg) of tert-butyl acetoacetate were charged to a 15 gallon (56.7 liter) reactor equipped with mechanical agitation and a distillation column. The mixture, under a nitrogen pad, was heated to 185° C. with agitation over a period of two hours at which point distillation of tert-butanol began. The temperature was further raised in a one hour period to 200° C. and held for three hours. The temperature was lowered to 160° C. and the pressure reduced slowly to 5 mm Hg. The mixture was held at the reduced pressure for two hours to insure the removal of the tert-butanol was complete. This process yielded a pale yellow liquid with viscosity of 1170 mPa.s at 25° C. and a carbonyl number of 30.

82.5 pounds (37.5 kg) of the acetoacetylated polyol prepared as described above and 4.83 pounds (2.2 kg) of toluenediamine (TDA) were charged to a 15 gallon (56.7 liter) reactor equipped with mechanical agitation and a distillation column. To this well stirred mixture was added 0.008 pounds (0.0036 g) of triflouroacetic acid. The mixture was heated to 90° C. under a nitrogen pad and held at that temperature for 30 minutes. The pressure was then reduced to 5 mm Hg over a one hour period and held at that temperature for three hours. The process yielded a yellow liquid with an amine number of 49 and a viscosity of 6450 mPa.s at 25° C.

ATP-C 80 pounds (36.4 kg) of a poly(oxypropylene) diol having a molecular weight of 1000 and 27.7 pounds (12.6 kg) of tert-butyl acetoacetate were charged to a 15 gallon (56.7 liter) reactor equipped with mechanical agitation and a distillation column. The mixture, under a nitrogen pad, was heated to 165° C. with agitation over a period of one hour at which point distillation of tert-butanol began. The temperature was further raised in a two hour period to 200° C. and held at that temperature for two hours. The temperature was lowered to 160° C. and the pressure reduced slowly to 5 mm Hg. The mixture was held at the reduced pressured for three hours to insure that removal of the tert-butanol was complete. This process yielded a pale yellow liquid with a carbonyl number of 98.

70 pounds (31.8 kg) of the acetoacetylated polyol of the above-described reaction product and 21 pounds (9.5 kg) of diethyl TDA (commercially available under the name Baytek E 505 from Miles Inc) were charged to a 15 gallon (56.7 liter) reactor equipped with mechanical agitation and a distillation column. To this well stirred mixture were added 0.007 pounds (0.0032 g) of triflouroacetic acid. The mixture was heated to 90° C. under a nitrogen pad and held at that temperature for 30 minutes. The pressure was then reduced to 5 mm Hg over a one hour period and held at that temperature for three hours. The process yielded a yellow liquid with amine number 140 and a viscosity of 10,600 mPa.s at 25° C.

ATP-D

Excess TDA was removed from ATP-B by wiped thin-film evaporation to provide a clear liquid having a viscosity of 7460 mPa.s (25° C.) and an amine number 37.9.

ATP-E

Excess diethyl TDA was removed from ATP-C by wiped thin-film evaporation to provide a clear liquid having a viscosity of 11,260 mPa.s (25° C.) and an amine number 58.0.

The expression MDI x/y is used in these Examples to indicate the composition of the mixture of the isocyanates used. In this expression, x represents the weight percent of diisocyanate in the isocyanate mixture. "y" represents the total weight percent of 2,2'- and 2,4'-isomers of diisocyanatodiphenylmethane in the isocyanate mixture. When x is less than 100, that difference between 100 and the number given is the weight percent of the isocyanate mixture which is made up the higher homolog(s) of diisocyanatodiphenylmethane.

EXAMPLES 1-5

25 parts of ATP-C were added to 100 parts of MDI 78/25 at 50° C. with good stirring. The reaction mixture was stirred at 50° C. for an additional 30 minutes. The reaction product was cooled to 25° C. to give a turbid liquid having an NCO content of 24.0% and a viscosity at 25° C. of 23,850 mPa.s.

The above procedure was repeated using 100 parts of MDI 78/25 and the amount of ATP-A, ATP-B, ATP-D or ATP-E indicated in Table 1. The properties of the resultant prepolymer are reported below in Table 1.

TABLE 1

| Ex. | ATP | parts ATP | Appearance | % NCO | Viscosity at 25° (mPa · s) |
|---|---|---|---|---|---|
| 1 | C | 25.0 | turbid | 24.0 | 23,850 |
| 2 | B | 30.0 | turbid | 24.0 | 1860 |
| 3 | A | 27.0 | clear | 25.0 | 1720 |
| 4 | E | 30.4 | clear | 24.0 | 5400 |
| 5 | D | 32.0 | clear | 24.1 | 1070 |

EXAMPLES 6–10

20.0 parts of ATP-C were added to 100 parts of MDI 78/25 at 120° C. with good stirring. The reaction mixture was stirred for an additional 35 minutes at 120° C. then cooled to 25° C. The product was a clear liquid having an NCO content of 24.1% and a viscosity at 25° C. of 2300 mPa.s.

This procedure was repeated using 100 parts of MDI 78/25 and the amount of ATP-A, ATP-B, ATP-D or ATP-E indicated in Table 2. The properties of the prepolymers obtained are reported below in Table 2.

TABLE 2

| Ex. | ATP | parts ATP | Appearance | % NCO | Viscosity at 25° C. (mPa · s) |
|---|---|---|---|---|---|
| 6 | C | 20.0 | clear | 24.1 | 2300 |
| 7 | B | 26.0 | clear | 24.1 | 930 |
| 8 | A | 22.0 | clear | 25.0 | 540 |
| 9 | D | 28.6 | clear | 24.1 | 680 |
| 10 | E | 25.9 | clear | 24.1 | 1760 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A liquid storage-stable isocyanate prepolymer having an isocyanate group content of from 5 to 30% by weight, prepared by reacting:

a) a polyfunctional amino-crotonic acid ester corresponding to the general formula:

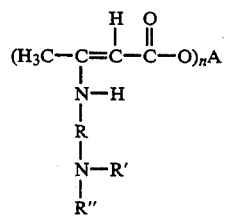

in which
   R represents a hydrocarbyl moiety selected from alkyl, alkenyl, cycloalkyl, aralkyl and aryl radicals,
   R' represents hydrogen or a hydrocarbyl moiety selected from alkyl, alkenyl, cycloalkyl, aralkyl and aryl radicals which moiety may optionally contain a primary or secondary amine group, and
   R" represents hydrogen or a hydrocarbyl moiety selected from alkyl, alkenyl, cycloalkyl, aralkyl and aryl radicals which moiety may optionally contain a primary or secondary amine, or
   R' and R" together represent a cyclic moiety containing at least one primary or secondary amine group in or on the cyclic moiety,
   A represents the radical of a polyol from which the terminal hydroxyl groups have been removed which polyol has a molecular weight between 250 and 6000 and a functionality of n, and
   n represents an integer of from 2 to 6, and b) a mixture of isocyanates made up of
      (1) from about 20 to about 100% by weight of the mixture is diphenylmethane diisocyanate having a total 2,2'-isomer and 2,4'-isomer content of from about 3 to about 50% by weight, and
      (2) from 0 to about 80% by weight of the mixture is polyphenylpolymethylene polyisocyanate,
   provided that when the mixture is made up of from 95 to 100% by weight of diphenylmethane diisocyanate, at least 10% by weight of the mixture is made up of the 2,2' and 2,4'-isomers.

2. The liquid prepolymer of claim 1 in which the aminocrotonate is a reaction product of a polyfunctional acetoacetic acid ester and ammonia or an organic compound containing one or more primary amino groups.

3. The liquid prepolymer of claim 2 in which the polyfunctional acetoacetic acid ester is prepared by reacting (i) a $C_1$ to $C_5$ alkyl acetoacetate with (ii) an organic compound containing from 2 to 6 hydroxyl groups and having a molecular weight of from 62 to 12000, in a ratio of one mole of the acetoacetate for each hydroxyl group.

4. The process of claim 2 in which the organic compound containing one or more primary amino groups is 1,5-diamino-2-methylpentane.

5. A process for preparing a polyurethane comprising reacting the isocyanate prepolymer of claim 1 with an organic compound containing active hydrogen groups.

6. The process of claim 5 in which the reaction is carried out using a reaction injection molding technique.

* * * * *